(12) United States Patent
Na (10) Patent No.: US 7,967,386 B2
(45) Date of Patent: Jun. 28, 2011

(54) ARMREST ASSEMBLY FOR AUTOMOBILE SEAT

(75) Inventor: Seon Chae Na, Pohang-si (KR)

(73) Assignee: Hyundai Motor Company, Seoul (KR)

( * ) Notice: Subject to any disclaimer, the term of this patent is extended or adjusted under 35 U.S.C. 154(b) by 174 days.

(21) Appl. No.: 12/183,831

(22) Filed: Jul. 31, 2008

(65) Prior Publication Data

US 2009/0267398 A1    Oct. 29, 2009

(30) Foreign Application Priority Data

Apr. 24, 2008 (KR) ........................ 10-2008-0038337

(51) Int. Cl.
*B60N 2/02* (2006.01)
*B60N 2/46* (2006.01)
*A47C 13/00* (2006.01)

(52) U.S. Cl. ..................... 297/378.1; 297/125; 297/129; 297/411.33; 297/411.39

(58) Field of Classification Search ............ 297/411.32, 297/411.33, 411.3, 378.1, 188.04, 188.05, 297/411.9, 124, 125, 188.21, 248, 129
See application file for complete search history.

(56) References Cited

U.S. PATENT DOCUMENTS

| | | | | |
|---|---|---|---|---|
| 3,512,827 A | * | 5/1970 | Stange | 296/64 |
| 4,046,419 A | * | 9/1977 | Schmitt | 297/153 |
| 4,252,371 A | * | 2/1981 | Lehnen | 297/411.4 |
| 4,886,317 A | * | 12/1989 | Konzmann et al. | 297/411.39 |
| 5,547,245 A | * | 8/1996 | Knouse | 297/85 C |
| 5,681,079 A | * | 10/1997 | Robinson | 297/61 |
| 5,941,602 A | * | 8/1999 | Sturt et al. | 297/340 |
| 6,238,002 B1 | * | 5/2001 | Brewer et al. | 297/411.32 |
| 6,540,295 B1 | * | 4/2003 | Saberan et al. | 297/344.21 |
| 7,044,550 B2 | * | 5/2006 | Kim | 297/283.3 |
| 7,108,323 B2 | * | 9/2006 | Welch et al. | 297/284.9 |
| 7,125,080 B1 | * | 10/2006 | Jarema et al. | 297/411.32 |

FOREIGN PATENT DOCUMENTS

| | | |
|---|---|---|
| JP | 6-6083 U | 1/1994 |
| JP | 2003-312337 A | 11/2003 |

\* cited by examiner

*Primary Examiner* — David Dunn
*Assistant Examiner* — Tania Abraham
(74) *Attorney, Agent, or Firm* — Morgan, Lewis & Bockius LLP

(57) ABSTRACT

An armrest assembly for an automobile seat, in which an armrest protrudes from a foldable seatback such that a passenger rests his/her arm on the armrest when the seatback is folded, and comes into contact with the seatback when the seatback is folded out in order to take a seat. The armrest assembly includes an armrest, which is installed on a seatback of the seat via links so as to protrude from the seatback, an external force transmitting device, which is coupled with at least one of the links, and transmits external force to the coupled link such that the armrest protrudes from the seatback, and a pressing unit, which installed on one side of the seatback such that the external force is applied to the external force transmitting device when the seatback is folded.

20 Claims, 8 Drawing Sheets

ARMREST ASSEMBLY FOR AUTOMOBILE SEAT

CROSS-REFERENCE TO RELATED APPLICATION

This application claims the benefit of Korean Patent Application No. 10-2008-0038337 filed on Apr. 24, 2008, in the Korean Intellectual Property Office, the disclosure of which is incorporated herein by reference.

BACKGROUND OF THE INVENTION

1. Field of the Invention

The present invention relates to an armrest assembly for an automobile seat and, more particularly, to an armrest assembly for an automobile seat, in which an armrest protrudes pivotally forwards from a foldable seatback such that a passenger rests his/her arm on the armrest when the seatback is folded downwards, and comes into contact with the seatback when the seatback is folded upwards in order to take a seat.

2. Description of the Related Art

In a vehicle, an armrest is a convenient accessory on which a driver or a passenger rests his/her arm when making a long excursion in order to reduce fatigue of his/her arm and shoulder resulting from long-term driving.

Such an armrest is generally installed in a space between a driver seat and a passenger seat. Recently, the armrest has been installed on both sides of a seat, and particularly has frequently been applied to a rear seat for comfortable boarding of a rear passenger.

In the case of the rear seat, the vehicle has two rows of seats or three rows of seats according to its model. Generally, in the case of the two rows of seats, each rear seat is equipped with the armrest on both sides of the seatback thereof. In the case of the three rows of seats, most center seats are folded, so that it is difficult to install the armrest on the intermediate seat due to interference of the armrest.

Figure 1:
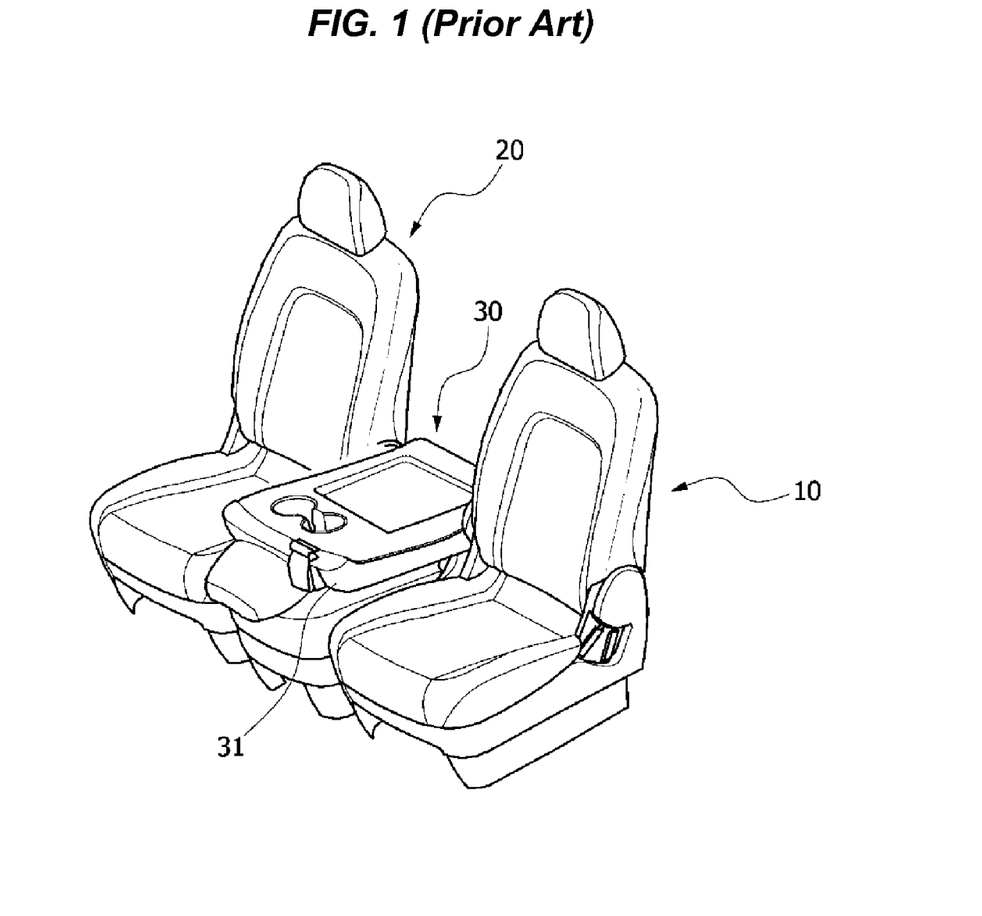
FIG. 1 is a perspective view illustrating the arrangement of three rows of rear seats in a vehicle in the conventional art.

FIG. 1 is a perspective view illustrating the arrangement of three rows of rear seats in a vehicle.

As illustrated in FIG. 1, three different rear seats are arranged in a vehicle. Among them, the center seat 30 is installed between the left-hand seat 10 and the right-hand seat 20 so as to be able to be folded.

In this manner, since the center seat 30 is folded, the armrest can be generally installed on the left-hand side of the left-hand seat 10 and on the right-hand side of the right-hand seat 20. However, the armrest cannot be installed on the right-hand side of the left-hand seat 10 and on the left-hand side of the right-hand seat 20, which interfere with the center seat 30.

Thus, as illustrated in FIG. 1, when no passenger takes the center seat 30, the center seat 30 is folded, and then passengers who take the seats adjacent to the center seat use the seatback of the folded center seat instead of the armrest. However, even when the center seat 30 is folded, the height thereof is low, and thus it is insufficient for the center seat 30 to serve as the armrest.

As such, the passengers who take the seats adjacent to the center seat 30 lean their bodies to the center seat 30 in order to rest their arms on the seatback 31 of the center seat 30. If the passengers sit in this uncomfortable posture for a long time, this bad posture of the passenger causes spinal curvature.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention provides an armrest assembly for an automobile seat, in which, when a center seat among three rows of seats is folded, armrests automatically protrude from the back of the center seat, thereby enabling passengers, each of whom takes a seat adjacent to the center seat, to conveniently use the arm rests.

According to an aspect of the invention, there is provided an armrest assembly for an automobile seat, which includes an armrest, which is installed on a seatback of the seat via links so as to protrude pivotally forwards from the seatback, an external force transmitting device, which is coupled with at least one of the links, and transmits external force to the coupled link such that the armrest protrudes from the seatback, and a pressing unit, which installed on one side of the seatback such that the external force is applied to the external force transmitting device when the seatback is folded downwards.

In an exemplary embodiment of the present invention, an external force transmitting device may be coupled with an extending part of the at least one of the link.

In another exemplary embodiment of the present invention, an end of the link may be installed with an elastic member to provide a restoring force to the link when the seatback is folded upwards.

Here, the armrest may have a four-bar link mechanism, which is installed on the seatback using two links.

Further, the external force transmitting device may include a cable, a first end of which is coupled to one of the links or the extending part and a second end of which extends toward the pressing unit, and a trunnion, which protrudes from the second end of the cable such that the cable is pulled by the external force transmitted from the pressing unit when the seatback is folded downwards.

Also, the second end of the cable may include a trunnion guide having a guide slot such that the trunnion moves along a predetermined path.

Further, the guide slot may have an arcuate shape so as to correspond to a pivoting path of the pressing unit.

Meanwhile, the armrest may have the shape of a typical armrest, which is provided on at least one of left-hand and right-hand sides of the seatback.

Further, the armrest may have the shape of a table by which left-hand and right-hand sides of the seatback are connected into one.

According to the present invention, the armrest automatically protrudes from the seatback when the seatback is folded, so that the passenger, who takes a seat adjacent to the seat having the armrest, can more conveniently use the armrest.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EXEMPLARY EMBODIMENT

The present invention will now be described more fully hereinafter with reference to the accompanying drawings, in which exemplary embodiments thereof are shown. Reference now should be made to the drawings, in which the same reference numerals and signs are used throughout the different drawings to designate the same or similar components. In the following description of the present invention, a detailed description of known functions and components incorporated herein will be omitted when it may make the subject matter of the present invention rather unclear.

Figure 2:
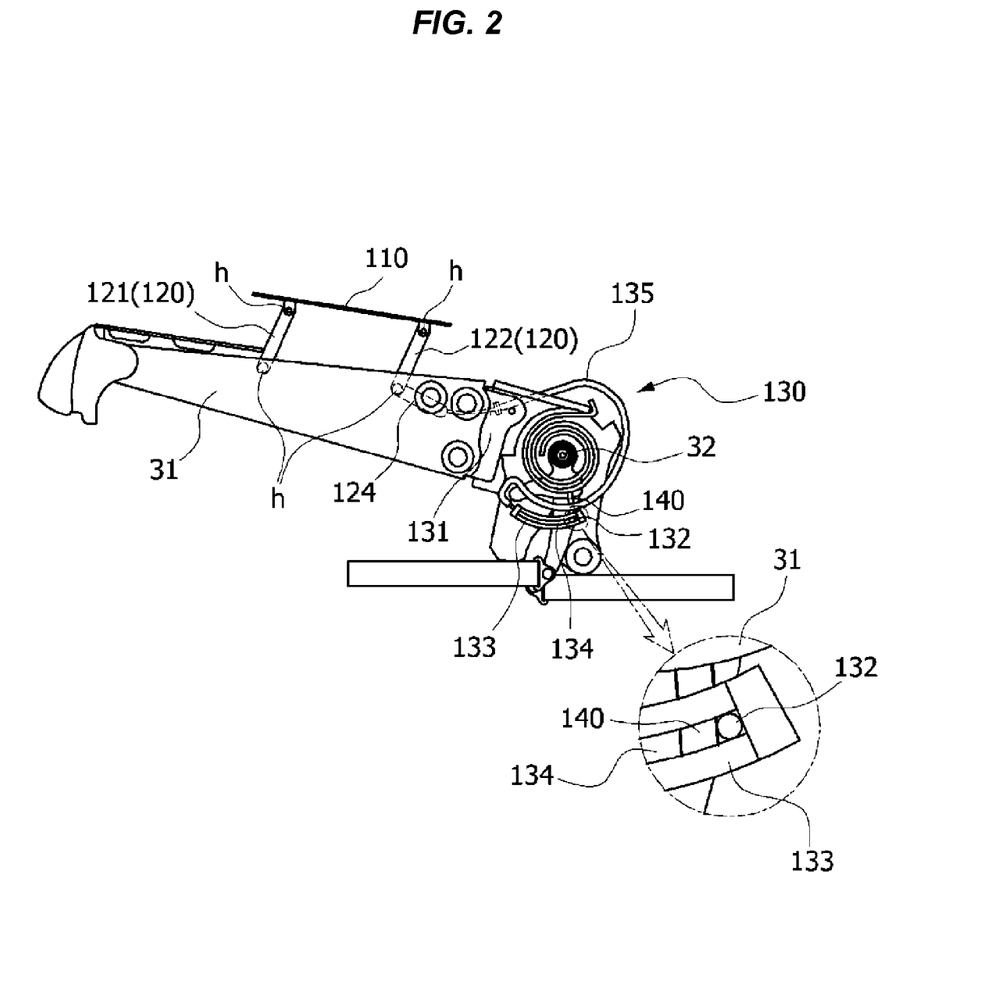
FIG. 2 is a front elevation view illustrating an armrest assembly for an automobile seat according to an exemplary embodiment of the present invention.
Figure 3:
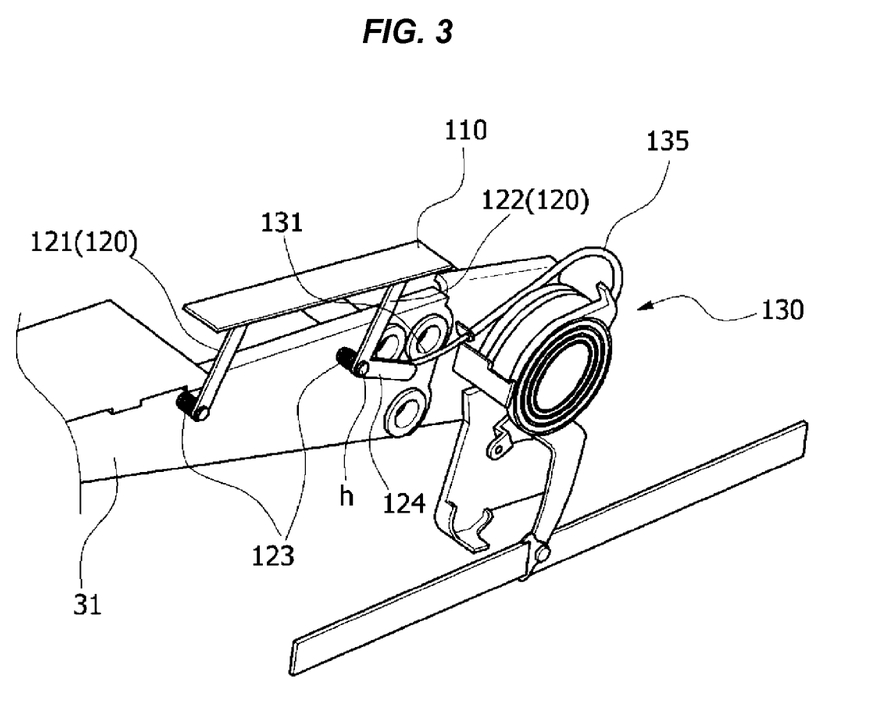
FIG. 3 is an assembled perspective view illustrating an armrest assembly for an automobile seat according to an exemplary embodiment of the present invention.
Figure 4A:
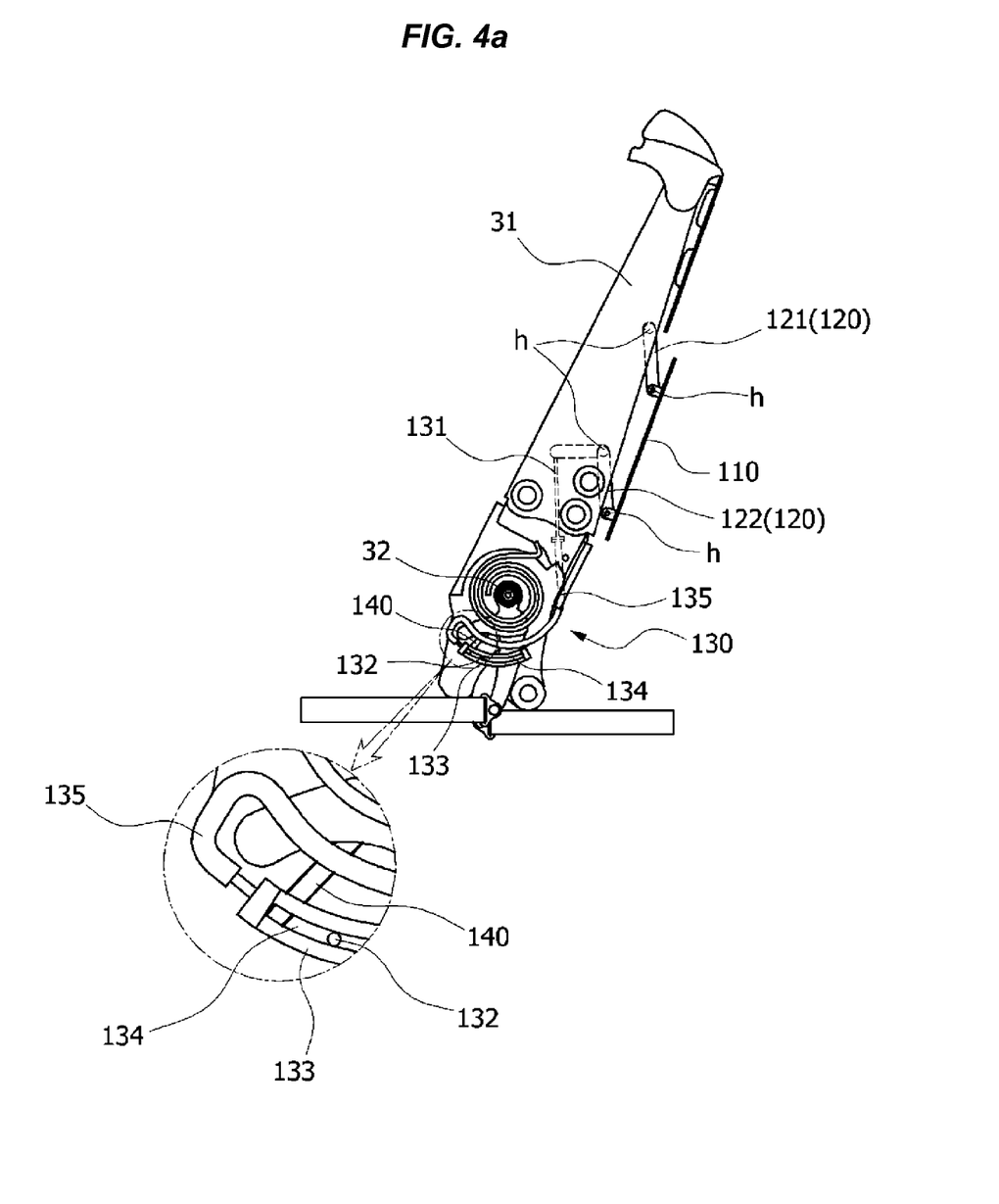
FIGS. 4A through 4C are views explaining the operation of an armrest assembly for an automobile seat according to an exemplary embodiment of the present invention.

Referring to FIGS. 2, 3 and 4A, illustrative embodiment of the present invention is adapted so that armrest 110 protrudes pivotally forwards from a seatback 31 when the seatback 31 is folded downwards but the armrest 110 comes into close contact with the seatback 31 again when the seatback 31 is folded upwards, and generally includes an armrest 110, an external force transmitting device 130, and a pressing unit 140.

The armrest 110 is pivotably coupled to the seatback 31 via at least a link 120. Thus, as the links 120 pivot in the counterclockwise direction in FIG. 2, the armrest 110 protrudes pivotally forwards from the seatback 31.

In an exemplary embodiment of the present invention, the armrest 110 has a four-bar link mechanism using two links 120 so as to move along a predetermined rotational path, and may be preferably installed on upper portion of the seatback 31 to couple the seatback 31 and the armrest 110. For convenience for description, one of the two links 120 is referred to as a first link 121, and the other as a second link 122.

The first link 121 and the second link 122 are spaced apart from each other at a predetermined distance, and are pivotally installed between the armrest 110 and the seatback 31. As an exemplary embodiment of the present invention, the first link 121 and the second link 122 may be coupled to the armrest 110 and the seatback 31 through hinges h respectively so as to be able to be separately pivoted.

Here, the hinges h, which couple the first link 121 and the second link 122 to the upper portion of the seatback 31, are equipped with elastic members 123, which apply a restoring force in a direction where the armrest 110 comes into close contact with the seatback 31, i.e., in the clockwise direction in FIG. 2. Each elastic member 123 may include a coil spring having torsion force as illustrated in FIG. 3. Thus, when no external force is applied to the first link 121 and the second link 122, the links 120 are pivoted downwards in the clockwise direction and thereby the armrest 110 comes into close contact with the seatback 31 by the restoring force of the elastic members 123.

Preferably, a lower end portion of at least one of the first link 121 and the second link 122 is co-axially coupled with an extension part 124 wherein the extension part 124 is orientated from the at least one of the first link 121 and the second link 122 with a predetermined angle. Further this extension part 124 is coupled with the external force transmitting device 130, which will be described below, and thereby a rotating force is provided to the links 120 by the external force transmitting device 130. In this embodiment, as illustrated, the extension part 124 is coupled with lower portion of the second link 122.

For reference, it should be noted that only a frame of the seatback 31, to which the first link 121 and the second link 122 is coupled, is shown without a fabric part in the accompanying drawings. However, this frame can be included in the seatback 31 described herein.

The external force transmitting device 130 is coupled to the at least one of the links 120 and can transmit external force to the coupled link 120 such that the armrest 110 may protrude pivotally forwards from the seatback 31 around the hinges h coupling the link 120 and the seatback 31.

Meanwhile, a pressing unit 140 is configured to apply the external force to the external force transmitting device 130. As well illustrated in FIGS. 2 and 4A, the pressing unit 140 is installed on rear side of the seatback 31 which rotates around a rotational shaft 32 so that the rotation of the seatback 31 can be transmitted to the external part 124. Thus, when the seatback 31 is folded downwards, the pressing unit 140 applies the external force to the external force transmitting device 130, the external force pivots the coupled link 120 in the counterclockwise direction, and thereby the armrest 110 protrudes pivotally forwards from the seatback against the restoring force of the elastic member 123.

For this reason, in order to allow the pressing unit 140 to provide an external force to the external part 124 while the seatback 31 is pivoted downwards, the pressing unit 140 protrudes with a predetermined length from a rear end of the seatback 31, wherein the rear end of the seatback 31 is rotatable around a rotational shaft 32. The pressing unit 140 is configured to be formed in a radial direction of the rotational shaft 32 and pivotal around the rotational shaft 32.

Here, as illustrated in FIG. 2, the external force transmitting device 130 includes a cable 131, a guide hose 135, and a trunnion 132 formed at a second end of the cable 131. A first end of the cable 131 is connected through the guide hose 135 to one of the links 120 such as a distal end of the extension part 124 of the second link 122 in this embodiment, and the second end of the cable 131 extends through the guide hose 135 toward the pressing unit 140. A portion of the guide hose 135 is coupled to the seatback 31 so that the rotation of the pressing unit 140 can be transferred to the links 120 therethrough.

The trunnion 132, which protrudes to be locked on the pressing unit 140, is provided at the second end of the cable 131, which extends toward the pressing unit 140. The trunnion 132 of the external force transmitting device 130 is placed substantially near to a portion of the pressing unit 140. The trunnion 132 receives the external force from the pressing unit 140 as the seatback 31 is folded downwards around the rotational shaft 32 of the seatback 31, and thereby moves along a predetermined path in the counterclockwise in FIG. 2 such that the cable 131 is pulled through the guide hose 135.

In other words, as the second end of the cable 131 is pulled by the pressing unit 140, the first end of the cable 131 pulls one end of the extension part 124 of the second link 122, so that the armrest 110 protrudes pivotally forwards from the seatback 31.

In addition, a trunnion guide 133, which can guide the trunnion 132 to move along the predetermined path, is installed on the side of the second end of the cable 131 outside the seatback 31. In other words, the trunnion guide 133 must be fixedly installed at its surrounding stationary place apart from the pivoting seatback 31.

Further, the trunnion guide 133 is provided with a guide slot 134, in which the trunnion 132 is fitted to move along the predetermined path. The guide slot 134 may have a linear shape. In this manner, when the guide slot 134 has the linear shape, there is a possibility of causing a slip between the trunnion 132 and the pressing unit 140. As such, it is more preferable that the guide slot 134 has an arcuate shape so as to correspond to the pivoting path of the pressing unit 140.

Figure 5A:
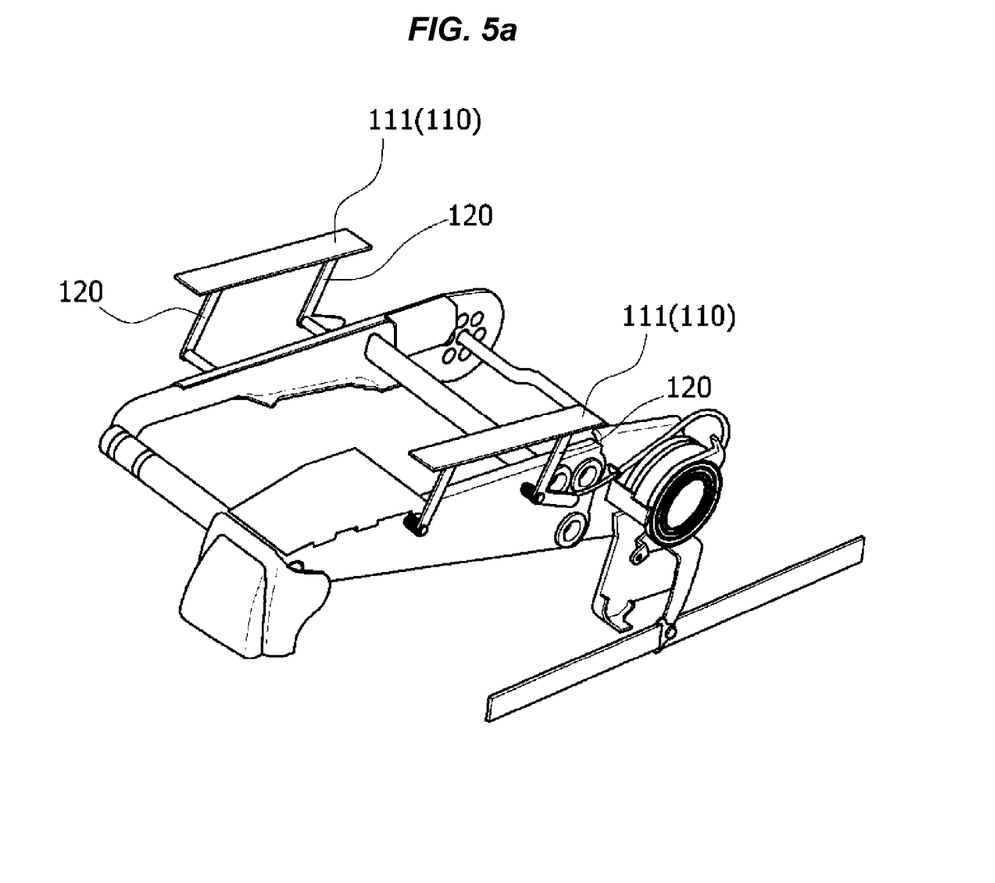
FIGS. 5A and 5B are views illustrating the configuration of an armrest in an armrest assembly for an automobile seat according to an exemplary embodiment of the present invention.

Meanwhile, in the armrest assembly configured in this way, the armrest 110 can have the shape of a typical armrest 111, which is provided on at least one of the left-hand and right-hand sides of the seatback 31, as illustrated in FIG. 5A.

In other words, the armrest 110 is divided into a left-hand armrest and a right-hand armrest on which the passenger can rest his/her arm.

Figure 5B:
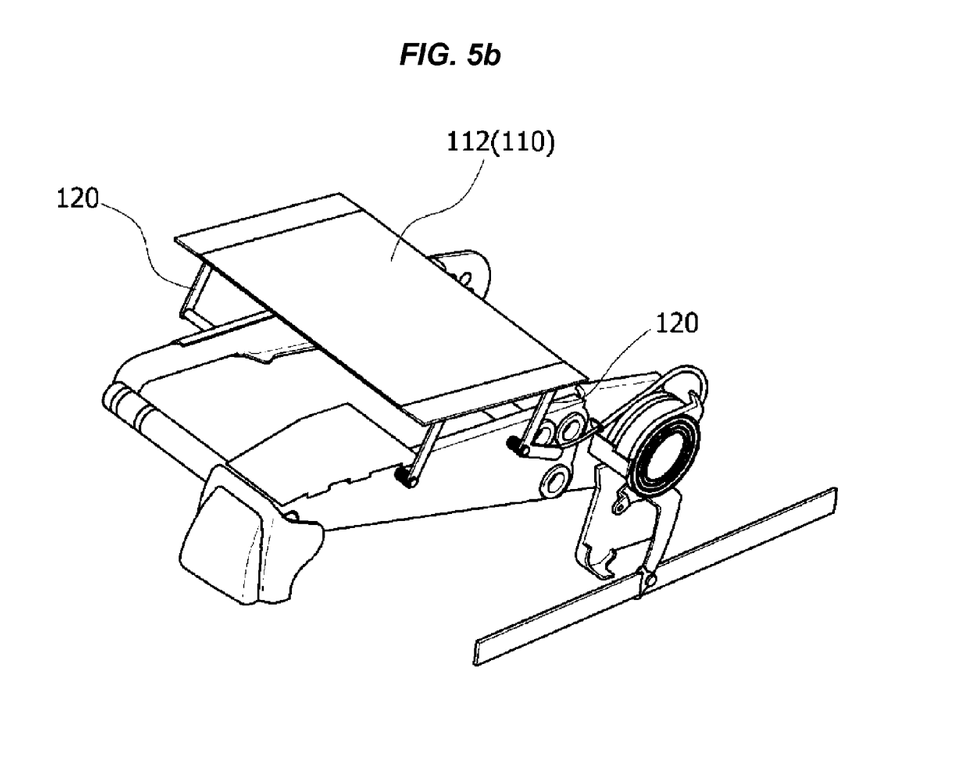

Unlike this configuration, as illustrated in FIG. 5B, the armrest 110 may have the shape of a table 112 by which the left-hand and right-hand sides of the seatback 31 are connected into one. In this manner, when the armrest 110 has the shape of the table 112, the passenger can place his/her arm as well as a bottle of beverage or a pack of snack. Thus, the armrest as illustrated in FIG. 5B is more useful that that as illustrated in FIG. 5A.

Hereinafter, the operation of the present invention will be described with reference to FIGS. 4A through 4C.

As illustrated in FIG. 4A, when the seatback 31 is folded upwards so as to enable a passenger to take a seat, the pressing unit 140 rotating in the clockwise direction according to rotation of the seatback 31 is not in contact with the trunnion 132, and thus no external force is applied to the external force transmitting device 130. Further since the trunnion 132 is spaced apart from the pressing unit 140 after the pressing unit 140 pivots in the clockwise direction, the self-weight of armrest 110 and the restoring force of the elastic member 123 installed on the hinges h coupling the links 120 and the seatback 31 can pull the cable 131 and the armrest 110 becomes in close contact with the seatback 31.

Of course, it can be seen from FIG. 4A that, even if the elastic members 123 are not installed on the hinges h of the links 120, the armrest 110 does not protrude but can be folded by self-weights of the armrest 110 and the links 120 when the seatback 31 is in an upright position. However, in consideration of more smooth operation, it is better for the elastic members 123 to be installed on the hinges h coupling the links 120 and the seatback 31.

Figure 4B:
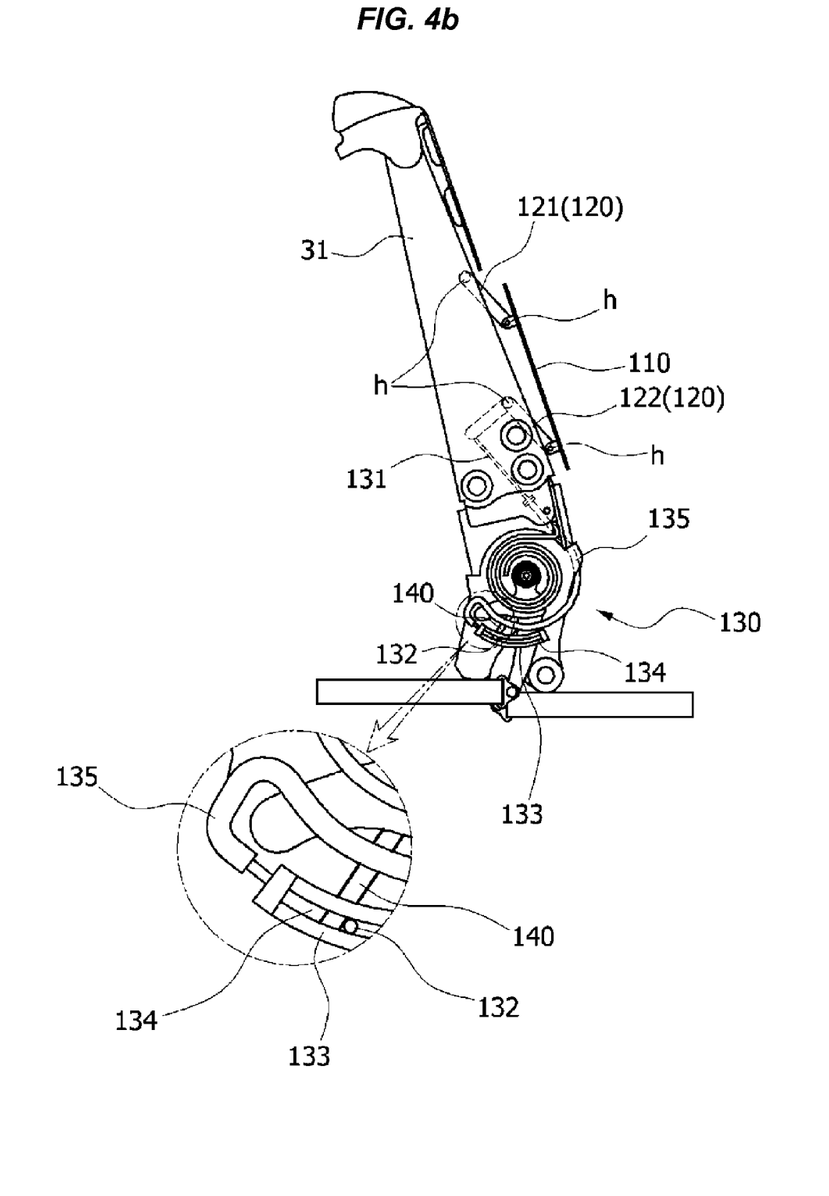

When the seatback 31 is gradually folded upwards in the state of FIG. 4A, and then reaches a position as illustrated in FIG. 4B, the pressing unit 140 rotating in the counterclockwise direction with rotation of the seatback 31 comes into contact with the trunnion 132. However, since no force is still applied to the trunnion 132, the armrest 110 does not protrude pivotally forwards from the seatback 31.

After this state, when the seatback 31 is folded further downwards, the pressing unit 140 comes to apply the external force to the trunnion 132 in the counterclockwise direction, and thereby the trunnion 132 moves along the guide slot 134 of the trunnion guide 133 in the counterclockwise direction in FIG. 4b. Thus, the cable 131 is pulled, and a pivoting force is transmitted to the second link 122.

At this time, the pivoting force transmitted to the second link 122 must be greater than the elastic force of the elastic members 123. In this case, the links 120 begin to pivot forwards. As in FIG. 4C, when the seatback 31 is completely folded downwards, the first link 121 and the second link 122 are completely pivoted around hinges h coupling the links 120 and the seatback 31, and thereby the armrest 110 protrudes pivotally forwards from the seatback 31.

Figure 4C:
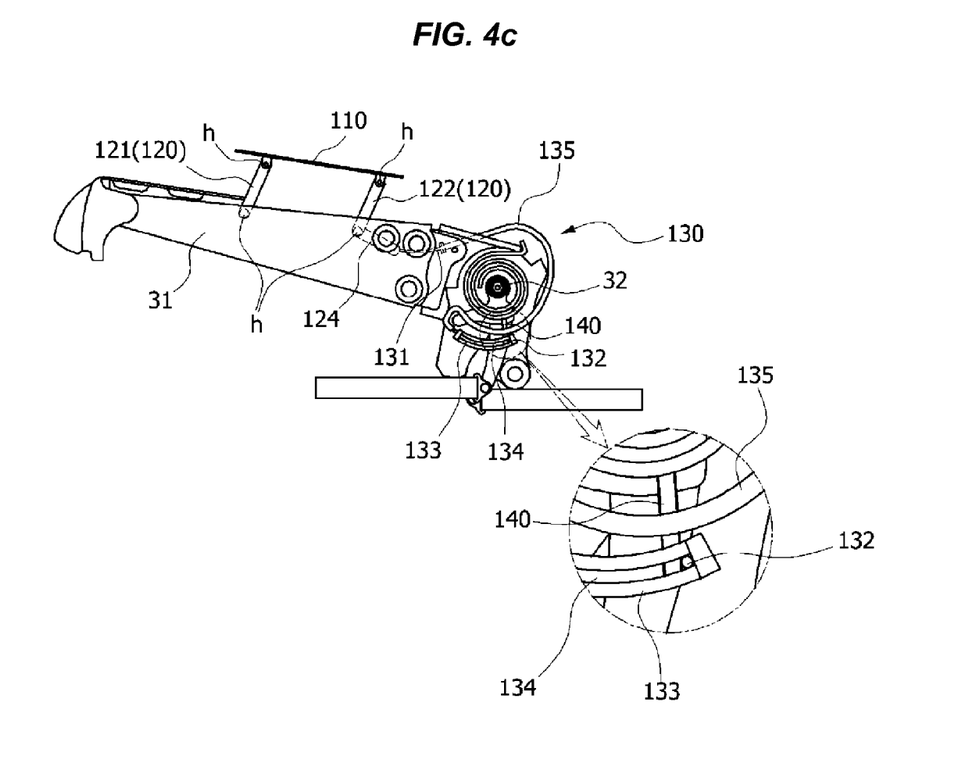

Meanwhile, when the seatback 31 is folded upwards again from the state of FIG. 4C, the pressing unit 140 rotating in the clockwise direction moves away from the trunnion 132 in the clockwise direction, and thereby the force of the pressing unit 140 applied to the trunnion 132 is released. Thereby, the trunnion 132 is returned to its original position by the cable 131, which is pulled by the restoring force of the elastic members 123. Thereby, the seatback 31 is in the state of FIG. 4A again.

While the present invention has been described with reference to the particular illustrative embodiments and the accompanying drawings, it is not to be limited thereto. Accordingly, the foregoing embodiments can be suitably modified and altered, and such applications fall within the scope and spirit of the present invention that shall be defined by the appended claims.

What is claimed is:

1. An armrest assembly for an automobile seat, comprising:
   an armrest, which is installed on a rear side of a seatback of the seat via a plurality of links that pivot from a first position within the seatback to a second position protruding from the seatback;
   an external force transmitting device, which is coupled with one of the plurality of links, and transmits external force to the coupled link such that the armrest protrudes pivotally forwards from the seatback when the external force is applied; and
   a pressing unit installed on one side of the seatback and applying the external force to the external force transmitting device when the seatback is folded downwards but releasing the external force when the seatback is folded upwards.

2. The armrest assembly according to claim 1, wherein the external force transmitting device comprises:
   a cable, a first end of which is coupled to one of the a plurality of links through a guide hose, and a second end of which extends through the guide hose toward the pressing unit; and
   a trunnion protruding from the second end of the cable such that the external force transmitted from the pressing unit is applied to the trunnion and thus the cable is pulled when the seatback is folded downwards.

3. The armrest assembly according to claim 2, wherein the trunnion of the cable is slidably coupled to a trunnion guide having a guide slot and moves along a predetermined path of the guide slot, wherein the trunnion guide is positioned outside the seatback and substantially near to a rotational axis of the seatback with a predetermined distance from the rotational axis.

4. The armrest assembly according to claim 3, wherein the guide slot has an arcuate shape, wherein a curvature of the arcuate shape substantially corresponds to a curvature of a pivoting path of the pressing unit.

5. The armrest assembly according to claim 1, wherein an extension part is coaxially coupled to the one of the a plurality of links with a predetermined angle.

6. The armrest assembly according to claim 5, wherein the external force transmitting device comprises:
   a cable, a first end of which is coupled to the extending part through a guide hose and a second end of which extends through the guide hose toward the pressing unit; and
   a trunnion protruding from the second end of the cable such that the external force transmitted from the pressing unit is applied to the trunnion and thus the cable is pulled when the seatback is folded downwards.

7. The armrest assembly according to claim 6, wherein the trunnion of the cable is slidably coupled to a trunnion guide having a guide slot and moves along a predetermined path of the guide slot, wherein the trunnion guide is positioned outside the seatback and substantially near to a rotational axis of the seatback with a predetermined distance from the rotational axis.

8. The armrest assembly according to claim 7, wherein the guide slot has an arcuate shape, wherein a curvature of the arcuate shape substantially corresponds to a curvature of a pivoting path of the pressing unit.

9. The armrest assembly according to claim 1, wherein at least one of the a plurality of links is elastically hinged to the seatback by at least an elastic member so that the armrest normally come into close contact with the seatback.

10. The armrest assembly according to claim 9, wherein the external force transmitting device comprises:
  a cable, a first end of which is coupled to one of the a plurality of links through a guide hose and a second end of which extends through the guide hose toward the pressing unit; and
  a trunnion protruding from the second end of the cable such that the external force transmitted from the pressing unit is applied to the trunnion and thus the cable is pulled when the seatback is folded downwards.

11. The armrest assembly according to claim 10, wherein the trunnion of the cable is slidably coupled to a trunnion guide having a guide slot and moves along a predetermined path of the guide slot, wherein the trunnion guide is positioned outside the seatback and substantially near to a rotational axis of the seatback with a predetermined distance from the rotational axis.

12. The armrest assembly according to claim 11, wherein the guide slot has an arcuate shape, wherein a curvature of the arcuate shape substantially corresponds to a curvature of a pivoting path of the pressing unit.

13. The armrest assembly according to claim 1, wherein at least one of the a plurality of links is elastically hinged to the seatback by at least an elastic member so that the armrest normally come into close contact with the seatback.

14. The armrest assembly according to claim 13, wherein an extension part is coaxially coupled to the one of the a plurality of links with a predetermined angle.

15. The armrest assembly according to claim 14, wherein the external force transmitting device comprises:
  a cable, a first end of which is coupled to the extending part through a guide hose and a second end of which extends through the guide hose toward the pressing unit; and
  a trunnion protruding from the second end of the cable such that the external force transmitted from the pressing unit is applied to the trunnion and thus the cable is pulled when the seatback is folded downwards.

16. The armrest assembly according to claim 15, wherein the trunnion of the cable is slidably coupled to a trunnion guide having a guide slot and moves along a predetermined path of the guide slot, wherein the trunnion guide is positioned outside the seatback and substantially near to a rotational axis of the seatback with a predetermined distance from the rotational axis.

17. The armrest assembly according to claim 16, wherein the guide slot has an arcuate shape, wherein a curvature of the arcuate shape substantially corresponds to a curvature of a pivoting path of the pressing unit.

18. The armrest assembly according to claim 1, wherein the armrest has a shape of a typical armrest, which is provided on at least one of left-hand and right-hand sides of the seatback.

19. The armrest assembly according to claim 1, wherein the armrest has a shape of a table by which left-hand and right-hand sides of the seatback are connected into one.

20. An armrest assembly for an automobile seat, comprising:
  an armrest, which is installed on a rear side of a seatback of the seat via a plurality of links that pivot from a first position within the seatback to a second position protruding from the seatback;
  an external force transmitting device, which is coupled with one of the plurality of links, and transmits external force to the coupled link such that the armrest protrudes pivotally forwards from the seatback when the external force is applied; and
  a pressing unit installed on one side of the seatback and applying the external force to the external force transmitting device when the seatback is folded downwards but releasing the external force when the seatback is folded upwards,
  wherein when a center seat among three rows of seats is folded, the armrest automatically protrudes from the back of the center seat, thereby enabling passengers, each of whom takes a seat adjacent to the center seat, to conveniently use the armrest.

* * * * *